US007883303B2

(12) United States Patent
Tang et al.

(10) Patent No.: US 7,883,303 B2
(45) Date of Patent: Feb. 8, 2011

(54) MACHINE TOOL SPINDLE STRUCTURE CAPABLE OF MONITORING WORKING STATE IN REAL TIME

(75) Inventors: Kuo-Yu Tang, Hsinchu (TW); Chun-Hung Huang, Hsinchu County (TW); Tzu-Hsin Kuo, Sanchong (TW)

(73) Assignee: Industrial Technology Research Institute, Hsinchu (TW)

( * ) Notice: Subject to any disclaimer, the term of this patent is extended or adjusted under 35 U.S.C. 154(b) by 205 days.

(21) Appl. No.: 12/352,635

(22) Filed: Jan. 13, 2009

(65) Prior Publication Data

US 2010/0145496 A1    Jun. 10, 2010

(30) Foreign Application Priority Data

Dec. 5, 2008    (TW) .............................. 97147558 A

(51) Int. Cl.
*B23Q 17/00*    (2006.01)
*B23C 5/26*    (2006.01)

(52) U.S. Cl. ............................. 409/232; 409/194; 408/8

(58) Field of Classification Search ................. 409/230, 409/144, 147, 148, 186, 187, 193–194, 207, 409/208, 214, 232, 234, 231; 408/8, 9, 10, 408/11, 16

See application file for complete search history.

(56) References Cited

U.S. PATENT DOCUMENTS 5,663,504 A * 9/1997 Kluft ........................... 73/660
6,474,914 B1 * 11/2002 Lang .......................... 409/144
6,554,551 B1 * 4/2003 Marelli ....................... 409/230
7,011,613 B2 * 3/2006 Moller et al. ............... 409/186
7,289,873 B2    10/2007 Redecker et al.
2006/0159533 A1 * 7/2006 Zeiler et al. ................. 408/226
2009/0162160 A1 * 6/2009 Lechleiter et al. .......... 409/201
2010/0034610 A1 * 2/2010 Yoneyama et al. .......... 409/231

FOREIGN PATENT DOCUMENTS

JP    11-254212 A    *    9/1999
JP    2006-129611 A    *    5/2006

OTHER PUBLICATIONS

Machine Translation of JP 2006-129611, which JP '611 was published in May 2006.*

* cited by examiner

*Primary Examiner*—Erica E Cadugan
(74) *Attorney, Agent, or Firm*—Stevens & Showalter LLP

(57) ABSTRACT

A machine tool spindle structure capable of monitoring a working state in real time includes a spindle body, a rotating mandrel, a cutter base, and an internal inspecting device. The cutter base is combined with the rotating mandrel and rotates with the rotating mandrel. The rotating mandrel has a chamber, and the internal inspecting device is disposed in the chamber. Inspecting chips in the internal inspecting device are directly disposed on the cutter base, so as to measure working parameters during a processing process. The working parameters are transmitted to an external information device by a wireless transmission module in the internal inspecting device, thereby accurately giving a feedback of the working state of a processing cutter in real time.

20 Claims, 4 Drawing Sheets

MACHINE TOOL SPINDLE STRUCTURE CAPABLE OF MONITORING WORKING STATE IN REAL TIME

CROSS-REFERENCE TO RELATED APPLICATIONS

This non-provisional application claims priority under 35 U.S.C. §119(a) on patent application No(s). 097147558 filed in Taiwan, R.O.C. on Dec. 5, 2008 the entire contents of which are hereby incorporated by reference.

BACKGROUND OF THE INVENTION

1. Field of Invention

The present invention relates to a machine tool member, in particular to a machine tool spindle structure having a device for inspecting a working state.

2. Related Art

Machine tools are machinery for manufacturing various machines and processing equipment, and may be categorized into metal cutting machine tools and metal molding machine tools according to functions. The metal cutting machine tools include lathes, drilling machines, milling machines, grinding machines, and planning machines, and the metal molding machine tools include punching machines and shearing machines. A machine tool is composed of several parts, in which in the drilling machine, the milling machine, the grinding machine, the planning machine, and other machine tools uses the rotational cutting movement, and the critical part affecting the processing quality is a machine tool spindle. Therefore, the accuracy of the machine tool spindle required by the machine tool manufacturers is quite strict.

During the operation of the machine tool, the material characteristics of the processed workpiece, the addition of the cutting fluid, and other practical processing situations may directly affect the processing quality. In early times, the working state of the machine tool spindle is practically inspected after the processing is finished. If the finished pieces cannot meet the accuracy demand, the machine tool spindle is adjusted or maintained, but the loss is generated. In order to solve the problem, some manufactures of the machine tools propose that an accelerometer, a thermometer, a strain gauge, or other inspecting devices are assembled outside the machine tool spindle, so as to measure the vibration, the temperature variation, the processing output torque, and other working parameters during the processing process. However, during the processing process, the cutting waste exists or the cutting fluid is sputtered near cutter, so the inspecting devices cannot be assembled adjacent to the cutter. Thus, the working parameters measured by the inspecting devices cannot really reflect the working state of the cutter, and it is not helpful to monitor the processing state in real time or improve the processing quality.

In order to solve the problem that the inspecting device of the machine tool spindle cannot really reflect the working state of the cutter, U.S. Pat. No. 7,289,873 has disclosed a sensor system for a cutting machine tool (hereafter referred to as Case 873). In the sensor system for the cutting machine tool provided in Case 873, a power supply unit is disposed in the machine tool, so as to supply the power required by at least one sensing chip in the machine tool. The at least one sensing chip may measure the torque, the noise, and other working states of the machine tool, and a data transmission unit wirelessly transmits the data to a receiving unit out of the machine tool. In Case 873, the sensing chip is disposed in the machine tool, so as to acquire the relatively precise working parameters of the actual working state, and wirelessly transmit the working parameters to the external receiving unit in real time for acquiring relevant information. In detail, in Case 873, the electric power required by the sensing chip, the microprocessor, and the data transmission unit is supplied by the power supply unit, which generates the electric power by using an induction coil. That is, when the machine tool spindle rotates, a relative change of the magnetic field generates the electric power. In order to solve the problem that it is impossible to directly dispose power lines in the machine tool, the power supply unit of Case 873 adopts the induction coil design. However, in Case 873, the induction coil, the sensing chip, and the data transmission unit are quite adjacent to one another, the magnetic field generated by the power supply unit will also directly interfere with the sensing chip or the data transmission unit, such that sensing chip cannot acquire the accurate data, or the wireless transmission of the data is affected.

SUMMARY OF THE INVENTION

In the conventional method for measuring a working state of a machine tool spindle, if an inspecting device is disposed out of the machine tool, acquired working parameters cannot really reflect the working state of a cutter; if the inspecting device is disposed in the machine tool spindle, required electric power is generated by an induction coil, but a magnetic field generated by the induction coil directly interferes with measurement or wireless transmission, such that real-time and accurate working parameters of the conventional machine tool spindle cannot be acquired. Accordingly, the present invention is directed to a machine tool spindle structure capable of reducing influence on measurement of real working parameters.

The present invention provides a machine tool spindle structure capable of monitoring a working state in real time, which includes a spindle body, a rotating mandrel, a cutter base, and an internal inspecting device. The cutter base is detachably combined with the rotating mandrel, the rotating mandrel has a chamber, and the internal inspecting device is disposed in the chamber. The internal inspecting device has a control substrate and an inspecting substrate separated from each other, a battery is disposed on the control substrate and is disposed on the rotating mandrel, and the inspecting substrate is directly disposed on a rotating center on a back side of the cutter base. The inspecting substrate has a plurality of inspecting chips, and the inspecting substrate is electrically connected to the control substrate through a connection cable. The inspecting chips are disposed on the cutter base, so as to accurately measure various working parameters during a processing process. A wireless transmission module is disposed on the control substrate, so as to deliver the various working parameters measured by the inspecting chips to an external information device, thereby giving a feedback of the working state of a processing cutter in real time.

In the machine tool spindle structure capable of monitoring the working state in real time provided by the present invention, the internal inspecting device is divided into the control substrate and the inspecting chips. The inspecting chips are directly disposed on the rotating center on the back side of the cutter base, and the working state of the processing cutter assembled on the cutter base is directly reflected on the cutter base and is measured by the inspecting chips without being affected by a centrifugal force of the cutter base, so as to acquire the accurate working parameters of the processing cutter. The battery supplying the electric power is disposed on the control substrate, such that the inspecting chips or the wireless transmission module is not interfered with by the magnetic field. The working parameters are wirelessly transmitted to the external information device, so as to give the feedback of the real working state in real time. Therefore, the present invention is an optimal design of applying the inspecting device into the machine tool spindle.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A machine tool spindle structure capable of monitoring a working state in real time provided by the present invention is used to measure a temperature, a vibration amount, a torque, and other working parameters of the machine tool spindle during a processing process. An external information device receives the working parameters, and displays and analyzes data, so as to give a feedback of the working state of a processing cutter in real time for operators, thereby achieving a good processing quality.

The machine tool provided by the present invention refers to a drilling machine, a milling machine, a grinding machine, a planning machine, and other machine tools adopting the rotationally cutting movement. The machine tool spindle may be categorized into gear power transmission, belt power transmission, direct power transmission, built-in motor, and other types according to the power source. A bearing of the machine tool spindle may be a rolling bearing, a hydrostatic bearing, an aerostatic bearing, or a magnetic bearing. The processing cutter is a drill, a milling cutter, a grinding wheel, or a plane iron. In the following embodiments, the power source types, the bearing types, and the processing cutter types of the machine tool spindle belong to the prior art, and will not be described again here. That is, the machine tool spindle structure having the device for inspecting the working state provided by the present invention may be applied to the above power source types or the bearing types.

Figure 1:
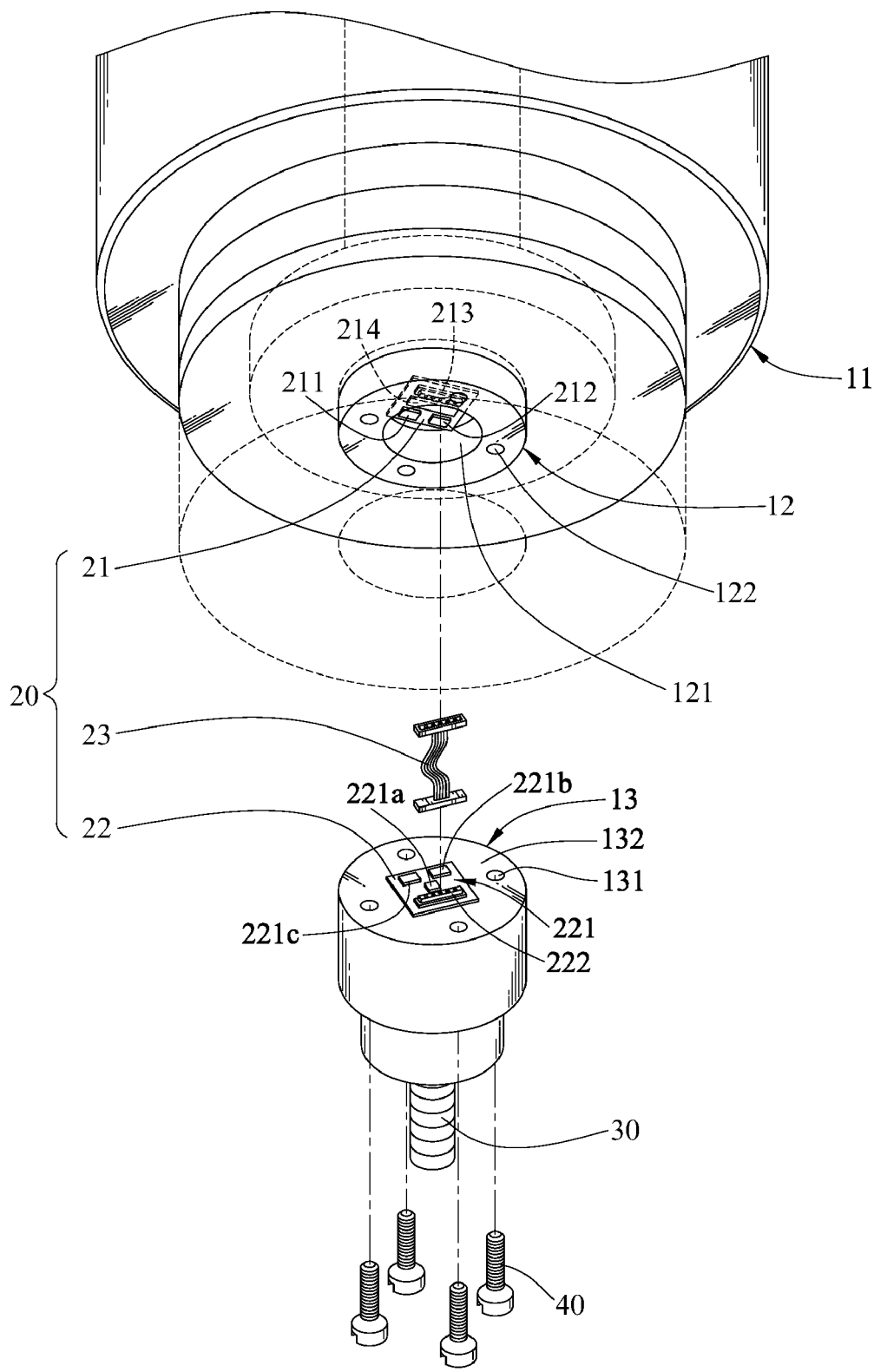
FIG. 1 is a schematic view of the present invention.
Figure 2:
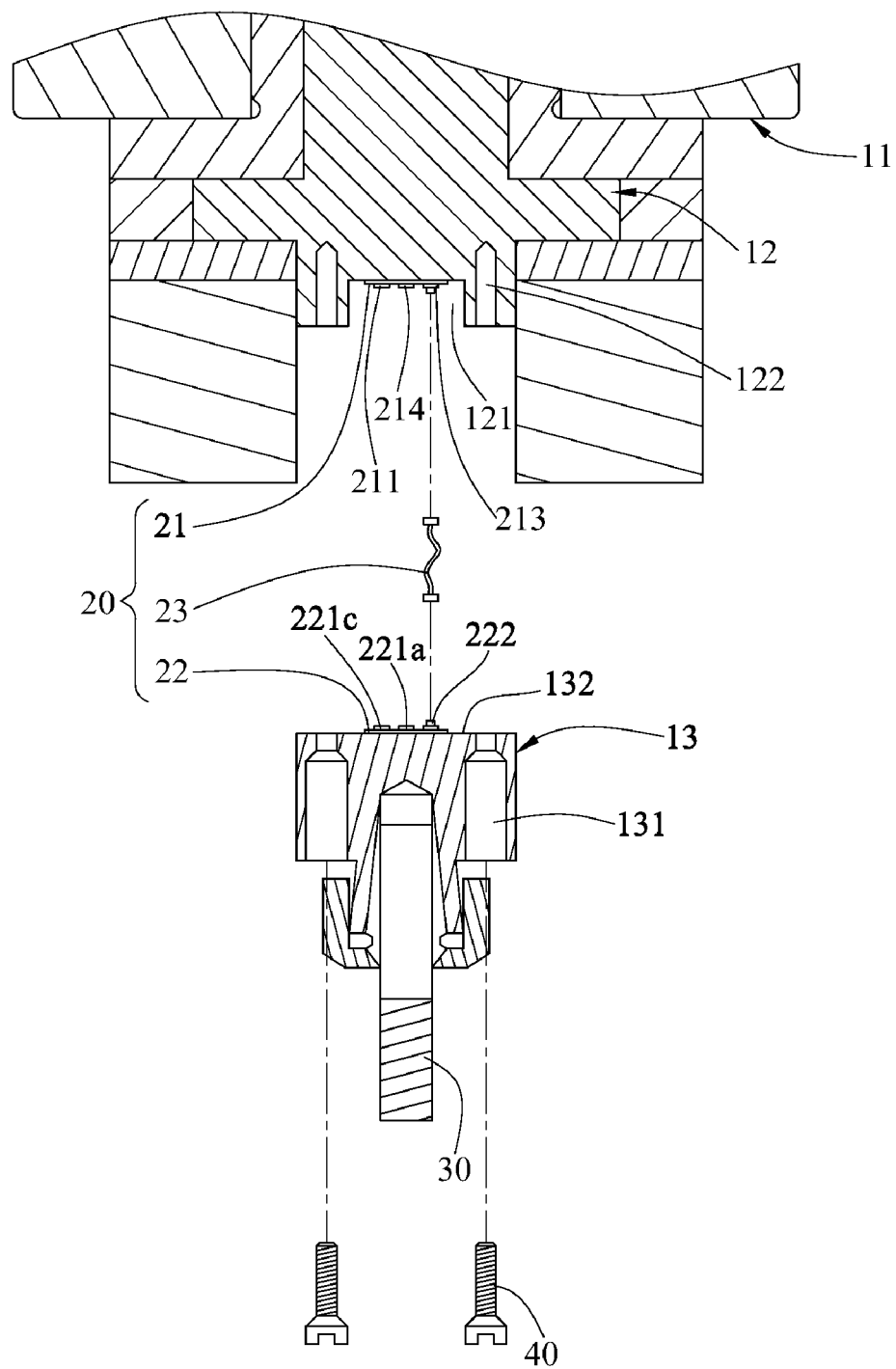
FIG. 2 is a cross-sectional structural view of the present invention.

Referring to FIGS. 1 and 2, the machine tool spindle structure capable of monitoring the working state in real time provided by the present invention includes a spindle body 11, a rotating mandrel 12, a cutter base 13, and an internal inspecting device 20.

The spindle body 11 is assembled on the machine tool (not shown), the rotating mandrel 12 is rotationally disposed on the spindle body 11 through the aerostatic bearing, and is driven by a power source (not shown) to rotate. A chamber 121 for combining the cutter base 13 is disposed on one end of the rotating mandrel 12, and a plurality of screw holes 122 is disposed on a periphery of the chamber 121.

A processing cutter 30, for example, a drill, a milling cutter, a grinding wheel, or a plane iron, is assembled on the cutter base 13. The cutter base 13 has a plurality of perforations 131 corresponding to the screw holes 122, and a back face of the cutter base 13 is a combining face 132. A plurality of screws 40 pass through the perforations 131 and is screwed in the screw holes 122 of the rotating mandrel 12, such that the cutter base 13 is combined with the rotating mandrel 12, and rotates together with the rotating mandrel 12. When the screws 40 are screwed out, the cutter base 13 is disassembled from the rotating mandrel 12.

The internal inspecting device 20 includes a control substrate 21 and an inspecting substrate 22. The control substrate 21 and the inspecting substrate 22 are respectively a printed circuit board and have electronic parts and circuit loops. The control substrate 21 at least includes a microprocessor 211, a wireless transmission module 212, a signal connector 213, and a battery 214, and the inspecting substrate 22 at least includes a plurality of inspecting chips 221 and a signal connector 222.

Figure 4:
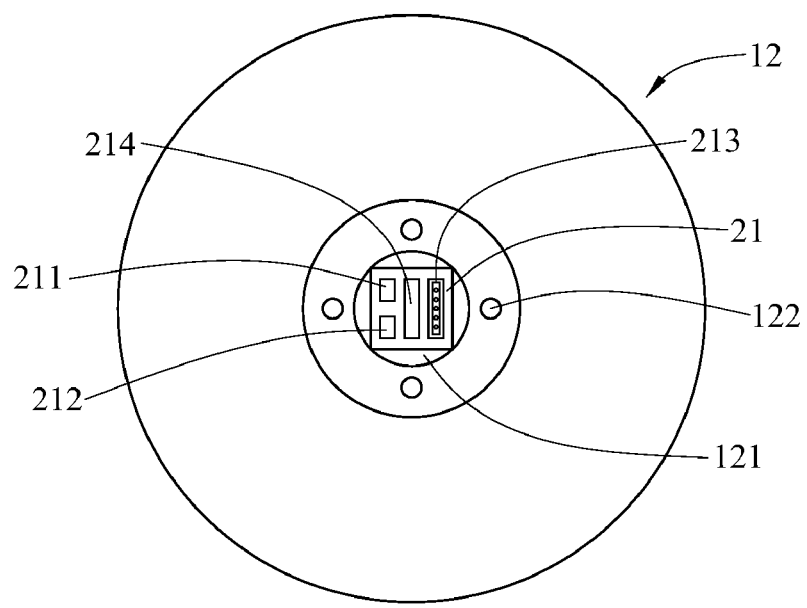
FIG. 4 is a schematic view of a control substrate in the present invention.

As shown in FIG. 4, the control substrate 21 is disposed on an end face of the rotating mandrel 12 and is located in the chamber 121, and the microprocessor 211 is responsible for all signal processing and commands of the internal inspecting device 20. The wireless transmission module 212 performs a wireless signal transmission by using a wireless radio frequency (RF) transmission technology or a Bluetooth wireless transmission technology. The battery 214 is a nickel-hydrogen battery, a lithium ion battery, or other rechargeable secondary batteries, or a fuel cell, for supplying the electric power required by all electronic parts of the internal inspecting device 20.

Figure 5:
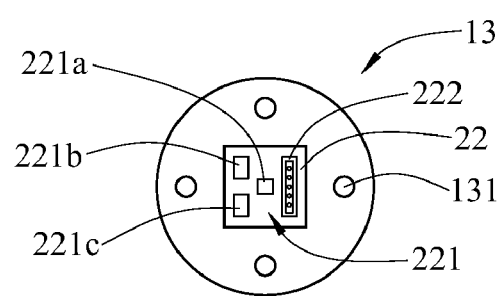
FIG. 5 is a schematic view of an inspecting substrate in the present invention.

As shown in FIG. 5, the inspecting substrate 22 is disposed on the combining face 132 of the cutter base 13, and is located on the rotating center of the cutter base 13. The plurality of inspecting chips 221 may include an accelerometer 221a, a thermometer 221b, or a strain gauge 221c, so as to respectively measure the vibration, the temperature variation, the processing output torque, and other working parameters during the processing process.

In addition, the control substrate 21 and the inspecting substrate 22 are connected to the signal connectors 213 and 222 respectively through a transmission cable 23, such that the control substrate 21 is electrically connected to the inspecting substrate 22, so as to transmit the working parameters measured by the inspecting chips 221 on the inspecting substrate 22 to the control substrate 21.

Figure 3:
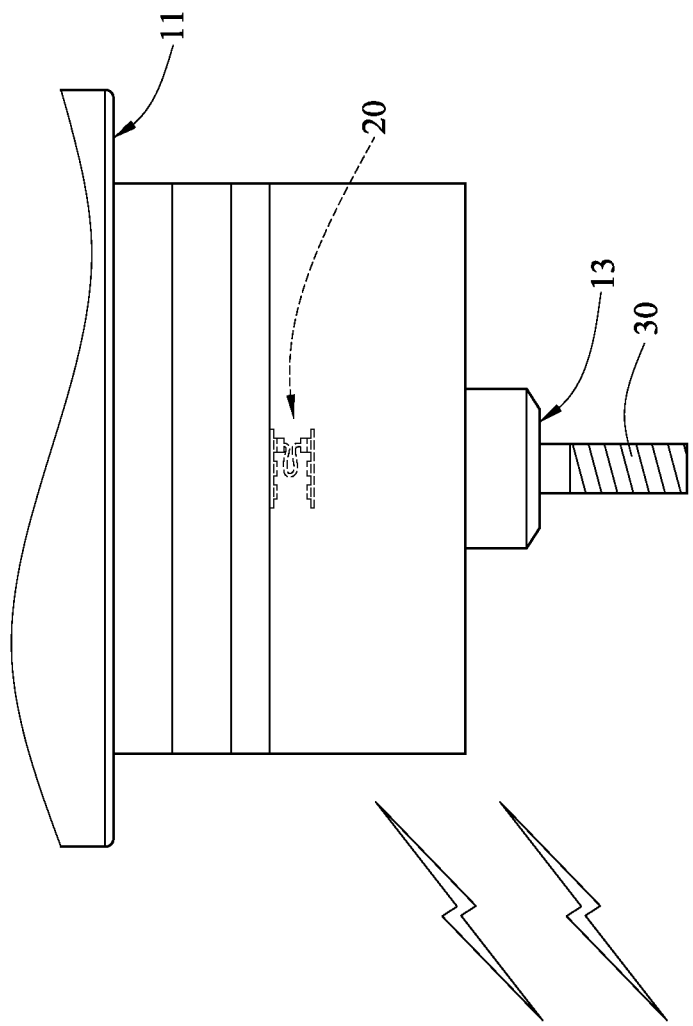
FIG. 3 is a schematic view of an application example of the present invention.
Figure 3:
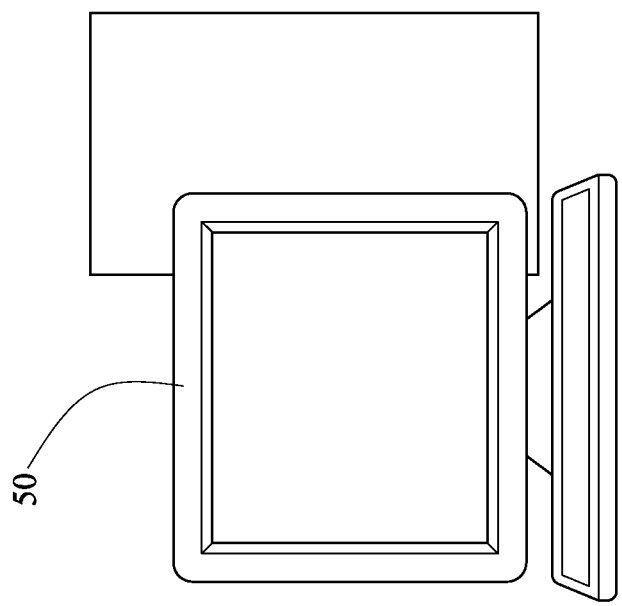

As shown in FIG. 3, in the machine tool spindle structure capable of monitoring the working state in real time provided by the present invention, the internal inspecting device 20 is assembled in the chamber 121 of the rotating mandrel 12. In particular, the internal inspecting device 20 has the control substrate 21 and the inspecting substrate 22, and the inspecting substrate 22 is disposed on the combining face 132 of the cutter base 13, and is located on the rotating center of the cutter base 13. If the accelerometer 221a for measuring the vibration is disposed on the rotating center, the measurement of the accelerometer 221a will not be affected by the centrifugal force generated the cutter base 13 rotates. The thermometer 221b is directly attached on and contacts with the combining face 132, so as to accurately acquire the working temperature of the processing cutter 30. The strain gauge 221c is away from the rotating center at a distance, so as to measure the accurate processing output torque.

The working parameter measured by each inspecting chip 221 is transmitted to the control substrate 21 through the transmission cable 23, the microprocessor 211 of the control substrate 21 externally transmits the working parameters to an external information device 50 through the wireless transmission module 212, and the external information device 50 receives the working parameters, and displays or analyzes the data, so as to give the feedback of the working state of the processing cutter 30 in real time for the operators, and to adjust the processing cutter 30 according to the practical working state, thereby achieving the good processing quality.

In the machine tool spindle structure capable of monitoring the working state in real time provided by the present invention, the electric power required by the internal inspecting device 20 is supplied by the battery 214, that is, the inspecting chip 221 is not interfered. When the electric power is exhausted, the cutter base 13 is disassembled for replacing or charging the battery. Further, the internal inspecting device 20 has the control substrate 21 and the inspecting substrate 22, such that the inspecting chips 221 on the inspecting substrate 22 may be disposed on the positions most adjacent to the processing cutter 30, so as to acquire the most accurate working parameters of the processing cutter 30. The accelerometer 221a is disposed on the rotating center of the cutter base 13, so the accelerometer 221a will not be affected by the centrifugal force generated during the rotating process. Thus, the present invention accurately gives the feedback of the working state of the processing cutter 30 in real time, and is an optimal design of applying the inspecting device into the machine tool spindle.

What is claimed is:

1. A machine tool spindle structure capable of monitoring a working state in real time, comprising:
a spindle body, having a chamber;
a cutter base, combined with the spindle body; and
an internal inspecting device, disposed in the chamber, and comprising a control substrate and an inspecting substrate, wherein the control substrate is disposed on the spindle body, the inspecting substrate is disposed on the cutter base, and the control substrate is electrically connected to the inspecting substrate through a transmission cable.

2. The machine tool spindle structure capable of monitoring a working state in real time according to claim 1, wherein a plurality of screw holes is disposed on the spindle body, a plurality of perforations corresponding to the screw holes is disposed on the cutter base, a plurality of screws passes through the perforations and is screwed in the screw holes, such that the cutter base is combined with the spindle body.

3. The machine tool spindle structure capable of monitoring a working state in real time according to claim 1, wherein the control substrate at least comprises a microprocessor, a wireless transmission module, a signal connector, and a battery.

4. The machine tool spindle structure capable of monitoring a working state in real time according to claim 3, wherein the control substrate is disposed on an end face of a rotating mandrel of the spindle body and is disposed in the chamber.

5. The machine tool spindle structure capable of monitoring a working state in real time according to claim 3, wherein the microprocessor is responsible for all signal processing and commands of the internal inspecting device.

6. The machine tool spindle structure capable of monitoring a working state in real time according to claim 3, wherein the wireless transmission module performs a wireless signal transmission by using a wireless radio frequency (RF) transmission technology or a Bluetooth wireless transmission technology.

7. The machine tool spindle structure capable of monitoring a working state in real time according to claim 3, wherein the battery is a nickel-hydrogen battery, a lithium ion battery, or other rechargeable secondary batteries, for supplying electric power required by all electronic parts of the internal inspecting device.

8. The machine tool spindle structure capable of monitoring a working state in real time according to claim 3, wherein the battery is a fuel cell, for supplying electric power required by all electronic parts of the internal inspecting device.

9. The machine tool spindle structure capable of monitoring a working state in real time according to claim 1, wherein the inspecting substrate is disposed on a combining face of the cutter base.

10. The machine tool spindle structure capable of monitoring a working state in real time according to claim 9, wherein the inspecting substrate is disposed on a rotating center of the cutter base.

11. The machine tool spindle structure capable of monitoring a working state in real time according to claim 10, wherein the inspecting substrate at least comprises a plurality of inspecting chips and a signal connector.

12. The machine tool spindle structure capable of monitoring a working state in real time according to claim 11, wherein one of the plurality of inspecting chips is an accelerometer.

13. The machine tool spindle structure capable of monitoring a working state in real time according to claim 12, wherein the accelerometer is disposed on the rotating center of the cutter base.

14. The machine tool spindle structure capable of monitoring a working state in real time according to claim 11, wherein one of the plurality of inspecting chips is a thermometer.

15. The machine tool spindle structure capable of monitoring a working state in real time according to claim 14, wherein the thermometer is directly attached on and contacts with the combining face of the cutter base.

16. The machine tool spindle structure capable of monitoring a working state in real time according to claim 11, wherein one of the plurality of inspecting chips is a strain gauge.

17. The machine tool spindle structure capable of monitoring a working state in real time according to claim 16, wherein the strain gauge is away from the rotating center of the cutter base at a distance.

18. The machine tool spindle structure capable of monitoring a working state in real time according to claim 11, wherein each working parameter measured by each of the inspecting chips is delivered to the control substrate through the transmission cable, the control substrate externally delivers the working parameters to an external information device, and the external information device receives the working parameters, and displays and analyzes data.

19. The machine tool spindle structure capable of monitoring a working state in real time according to claim 18, wherein each of the working parameters directly gives a feedback of the working state of a processing cutter disposed on the cutter base.

20. The machine tool spindle structure capable of monitoring a working state in real time according to claim 19, wherein the processing cutter is adjusted according to the feedback of the working state of the processing cutter.

* * * * *